(12) United States Patent  
Aral (10) Patent No.: US 7,065,440 B2
(45) Date of Patent: Jun. 20, 2006

(54) METHOD AND APPARATUS FOR STEERING MOVABLE OBJECT BY USING CONTROL ALGORITHM THAT TAKES INTO ACCOUNT THE DIFFERENCE BETWEEN THE NOMINAL AND OPTIMUM POSITIONS OF NAVIGATION ANTENNA

(75) Inventor: Gurcan Aral, Cupertino, CA (US)

(73) Assignee: Trimble Navigation, LTD, Sunnyvale, CA (US)

( * ) Notice: Subject to any disclaimer, the term of this patent is extended or adjusted under 35 U.S.C. 154(b) by 180 days.

(21) Appl. No.: 10/763,725

(22) Filed: Jan. 22, 2004

(65) Prior Publication Data

US 2005/0165546 A1    Jul. 28, 2005

(51) Int. Cl.
*G01C 21/00*    (2006.01)
*G06F 17/00*    (2006.01)

(52) U.S. Cl. .......................... 701/50; 701/41; 701/213; 342/358

(58) Field of Classification Search ................. 701/50, 701/41, 38, 213, 215, 216; 172/4.5, 439; 342/357.02, 357.14, 358
See application file for complete search history.

(56) References Cited

U.S. PATENT DOCUMENTS

| | | | |
|---|---|---|---|
| 5,299,130 A * | 3/1994 | Ono | 701/25 |
| 5,612,864 A | 3/1997 | Henderson | |
| 5,629,709 A * | 5/1997 | Yamashita | 342/359 |
| 5,789,014 A * | 8/1998 | Maruyama et al. | 427/2.14 |
| 6,073,070 A * | 6/2000 | Diekhans | 701/50 |
| 6,184,821 B1 * | 2/2001 | Hrovat et al. | 342/357.08 |
| 6,243,649 B1 | 6/2001 | Wetherbee et al. | |
| 6,345,231 B1 * | 2/2002 | Quincke | 701/213 |
| 6,445,983 B1 * | 9/2002 | Dickson et al. | 701/23 |
| 6,611,228 B1 | 8/2003 | Toda et al. | |
| 6,655,465 B1 * | 12/2003 | Carlson et al. | 172/4.5 |
| 6,681,180 B1 * | 1/2004 | Bevly et al. | 701/213 |
| 6,789,014 B1 | 9/2004 | Rekow et al. | |
| 6,886,656 B1 * | 5/2005 | Fujioka et al. | 180/402 |
| 6,941,225 B1 * | 9/2005 | Upadhyaya et al. | 701/213 |

* cited by examiner

*Primary Examiner*—Tan Q. Nguyen
(74) *Attorney, Agent, or Firm*—Boris G. Tankhilevich (57) ABSTRACT

A method of steering a vehicle along a predetermined, or real time path by using a steering control algorithm. The vehicle includes a navigation system and a navigation antenna. The navigation antenna is mounted on the vehicle at an optimum antenna position, whereas the steering control algorithm assumes a nominal antenna position at a predetermined reference point. The method comprises the following steps: (A) obtaining a set of positioning data of the vehicle by using the navigation system and by using the navigation antenna mounted at the optimum antenna position; (B) modifying the set of positioning data of the vehicle; (C) measuring a steering angle(s) of the front wheels of the vehicle relative to a predetermined reference direction(s); (D) calculating a correction(s) to the measured steering angle(s); and (E) performing a steering action by using the correction(s) to the measured steering angle(s) to move the vehicle along the predetermined, or real time path.

52 Claims, 3 Drawing Sheets

METHOD AND APPARATUS FOR STEERING MOVABLE OBJECT BY USING CONTROL ALGORITHM THAT TAKES INTO ACCOUNT THE DIFFERENCE BETWEEN THE NOMINAL AND OPTIMUM POSITIONS OF NAVIGATION ANTENNA

BACKGROUND OF THE INVENTION

1. Field of the Invention

The present invention is in the field of navigation of vehicles. More specifically, the present invention relates to a method and apparatus for steering vehicles by using a steering control algorithm that takes into account the difference between the nominal and optimum positions of a navigation antenna.

2. Discussion of the Prior Art

The prior art GPS systems are used to manually or automatically steer a vehicle (like a tractor) along a predetermined path. To achieve an automatic steering, the GPS information is fed to a steering control algorithm which calculates an appropriate steering action to steer the tractor (or another vehicle) onto the prescribed trajectory and keep it on that trajectory.

However, the prior art automatic steering control algorithm is based, among other things, on the assumption that a GPS (or other navigation) antenna is mounted at a specific nominal location on the vehicle (like a tractor) at a predetermined reference point relative to its geometry, for example, on the top of the driver's cabin, or over the center of the rear axle.

The performance of the prior art automatic steering control algorithm is dependent on the accuracy of this nominal navigation antenna position. Moving the navigation antenna to a different location on the vehicle would result in the performance degradation of the automatic steering control algorithm, in the undesired weaving, or even in instability.

On the other hand, the variety of factors may prevent mounting the navigation antenna at the prescribed nominal location of the vehicle. For example, the prescribed nominal location in terms of the steering control algorithm for the GPS antenna (for example, the top of the driver's cabin, or the center of the rear axle) may be occupied by some other fixtures, such as a CB antenna, a projector, etc.

Thus, in many prior art cases, the actual navigation antenna location on the vehicle may be different from the nominal assumed navigation antenna location on the vehicle, which can significantly degrade the performance of the prior art automatic steering control algorithm.

SUMMARY OF THE INVENTION

To address the shortcomings of the available art, the present invention provides a method and apparatus for automatic steering of a vehicle that takes into account an actual mounting location of a navigation antenna by modifying the input variables into the same prior art automatic steering algorithm.

One aspect of the present invention is directed to a method of steering a vehicle along a predetermined 2-D path on a 2-D plane by using a steering control algorithm, wherein the vehicle includes a navigation system and a navigation antenna.

In one embodiment of the present invention, the method of steering a vehicle along a predetermined 2-D path on a 2-D plane by using a steering control algorithm comprises the following steps: (A) obtaining a set of positioning data of the vehicle by using the navigation system and by using the navigation antenna mounted at the optimum antenna position; (B) modifying the set of positioning data of the vehicle; (C) measuring a steering angle of the front wheels of the vehicle relative to a predetermined reference direction on the 2-D plane; (D) calculating a correction to the measured steering angle on the 2-D plane; and (E) performing a steering action by using the correction to the measured steering angle on the 2-D plane in order to move the vehicle along the predetermined 2-D path on the 2-D plane.

In one embodiment of the present invention, the step (A) of obtaining the set of positioning data of the vehicle by using the navigation system and by using the navigation antenna mounted at the optimum antenna position further includes the step (A1) of obtaining the set of positioning data of the vehicle by using a navigation system selected from the group consisting of: {GPS; GLONASS; combined GPS/GLONASS; GALILEO; pseudolite-based navigation system; and inertial navigation system (INS)}.

In one embodiment of the present invention, the step (B) of modifying the set of positioning data of the vehicle further includes the step (B1) of specifying a distance a distance between a nominal antenna position and the optimum antenna position; wherein the steering control algorithm assumes the nominal antenna position at a predetermined reference point.

In one embodiment of the present invention, the step (C) of measuring the steering angle of the vehicle on the 2-D plane further includes the step (C1) of using an angular sensor to measure the steering angle of the front wheels of the vehicle relative to the predetermined reference direction on the 2-D plane. In another embodiment of the present invention, the step (C) of measuring the steering angle of the vehicle on the 2-D plane further includes the step (C2) of using a rotary potentiometer to measure the steering angle of the front wheels of the vehicle relative to the predetermined reference direction on the 2-D plane.

In one embodiment of the present invention, the step (D) of calculating the correction to the measured steering angle on the 2-D plane further includes the steps: (D1) of feeding a set of control data into the steering control algorithm; wherein the set of control data is selected from the group consisting of: {the set of modified positioning data of the vehicle; the measured steering angle on the 2-D plane; and a set of data defining the predetermined 2-D path on the 2-D plane}; and (D2) of calculating the correction to the measured steering angle on the 2-D plane by using the steering control algorithm.

In one embodiment of the present invention, the step (E) of performing the steering action by using the correction to the measured steering angle on the 2-D plane further includes the step (E1) of using a 2-D hydraulic system to realize the correction to the measured steering angle on the 2-D plane. In another embodiment of the present invention, the step (E) of performing the steering action by using the correction to the measured steering angle on the 2-D plane further includes the step (E2) of using a 2-D "flight by wire" system to realize the correction to the measured steering angle on the 2-D plane.

Another aspect of the present invention is directed to a method of steering a vehicle along a predetermined 3-D path on a 3-D surface by using a steering control algorithm.

In one embodiment of the present invention, the method of steering a vehicle along a predetermined 3-D path on a 3-D surface by using a steering control algorithm comprises the following steps: (A) obtaining a set of 3-D positioning data of the vehicle by using the navigation system and by using the navigation antenna mounted at the optimum antenna position; (B) modifying the set of 3-D positioning data of the vehicle; (C) measuring a set of steering angles on the 3-D surface; (D) calculating a set of corrections to the set of measured steering angles on the 3-D surface; and (E) performing a steering action by using the set of corrections to the set of measured steering angles on the 3-D surface in order to move the vehicle along the predetermined 3-D path on the 3-D surface.

In one embodiment of the present invention, the step (A) of obtaining the set of 3-D positioning data of the vehicle by using the navigation system and by using the navigation antenna mounted at the optimum antenna position further includes the step (A1) of obtaining the set of 3-D positioning data of the vehicle by using a navigation system selected from the group consisting of: {GPS; GLONASS; combined GPS/GLONASS; GALILEO; pseudolite-based navigation system; and inertial navigation system (INS)}.

In one embodiment of the present invention, the step (B) of modifying the set of 3-D positioning data of the vehicle further includes the step (B1) of specifying a distance between the nominal antenna position and the optimum antenna position.

In one embodiment of the present invention, the step (C) of measuring the set of steering angles of the vehicle on the 3-D surface further includes the step (C1) of using at least one angular sensor to measure the set of steering angles on the 3-D surface. In another embodiment of the present invention, the step (C) of measuring the set of steering angles of the vehicle on the 3-D surface further includes the step (C2) of using at least one rotary potentiometer to measure the set of steering angles on the 3-D surface.

In one embodiment of the present invention, the step (D) of calculating the set of corrections to the set of measured steering angles on the 3-D surface further includes the steps: (D1) of feeding a set of control data into the steering control algorithm; wherein the set of control data is selected from the group consisting of: {the set of modified positioning data of the vehicle; the measured steering angle on the 3-D surface; and a set of data defining the predetermined 3-D path on the 3-D surface}; and (D2) of calculating the set of corrections to the set of measured steering angles on the 3-D plane by using the steering control algorithm.

In one embodiment of the present invention, the step (E) of performing the steering action by using the set of corrections to the set of measured steering angles on the 3-D surface further includes the step (E1) of using a 3-D hydraulic system to realize the set of corrections to the set of measured steering angles on the 3-D surface. In another embodiment of the present invention, the step (E) of performing the steering action by using the set of corrections to the set of measured steering angles on the 3-D surface further includes the step (E2) of using a 3-D "flight by wire" system to realize the set of corrections to the set of measured steering angles on the 3-D plane.

One more aspect of the present invention is directed to a method of steering a vehicle along a 2-D path on a 2-D plane by using a steering control algorithm.

In one embodiment of the present invention, the method of steering a vehicle along a 2-D path on a 2-D plane by using a steering control algorithm comprises the following steps: (A) obtaining a set of positioning data of the vehicle by using the navigation system and by using the navigation antenna mounted at the optimum antenna position; (B) obtaining a set of positioning data that defines the 2-D path on the 2-D plane; (C) modifying the set of positioning data of the vehicle; (D) measuring a steering angle of the front wheels of the vehicle relative to a predetermined reference direction on the 2-D plane; (E) calculating a correction to the measured steering angle on the 2-D plane; and (F) performing a steering action by using the correction to the measured steering angle on the 2-D plane in order to move the vehicle along the 2-D path on the 2-D plane.

In one embodiment of the present invention, the step (B) of obtaining the set of positioning data that defines the 2-D path on the 2-D plane further includes the step (B1) of receiving the set of positioning data that defines the 2-D path on the 2-D plane by the navigation antenna.

In one embodiment of the present invention, the step (B1) of receiving the set of positioning data that defines the 2-D path on the 2-D plane further includes the step (B1,1) of receiving a set of broadcasted positioning data that defines the 2-D path on the 2-D plane. In this embodiment of the present invention, the set of broadcasted positioning data that defines the 2-D path on the 2-D plane is broadcasted by a Base Station (BS). In another embodiment of the present invention, the step (B1) of receiving the set of positioning data that defines the 2-D path on the 2-D plane further includes the step (B1,2) of receiving a set of Web-casted positioning data that defines the 2-D path on the 2-D plane. In this embodiment of the present invention, the set of Web-casted positioning data that defines the 2-D path on the 2-D plane is Web-casted from an Internet web-site.

One additional aspect of the present invention is directed to a method of steering a vehicle along a 3-D path on a 3-D surface by using a steering control algorithm.

In one embodiment of the present invention, the method of steering a vehicle along a 3-D path on a 3-D surface by using a steering control algorithm comprises the following steps: (A) obtaining a set of positioning data of the vehicle by using the navigation system and by using the navigation antenna mounted at the optimum antenna position; (B) obtaining a set of positioning data that defines the 3-D path on the 3-D surface; (C) modifying the set of positioning data of the vehicle; (D) measuring a set of steering angles of the front wheels of the vehicle on the 3-D surface; (E) calculating a set of corrections to the set of measured steering angles on the 3-D surface; and (F) performing a steering action by using the set of corrections to the set of measured steering angles on the 3-D surface in order to move the vehicle along the 3-D path on the 3-D surface.

In one embodiment of the present invention, the step (B) of obtaining the set of positioning data that defines the 3-D path on the 3-D surface further includes the step (B1) of receiving the set of positioning data that defines the 3-D path on the 3-D surface by the navigation antenna.

In one embodiment of the present invention, the step (B1) of receiving the set of positioning data that defines the 3-D path on the 3-D surface further includes the step (B1,1) of receiving a set of broadcasted positioning data that defines the 3-D path on the 3-D surface. In this embodiment, the set of broadcasted positioning data that defines the 3-D path on the 3-D surface is broadcasted by a Base Station (BS). In another embodiment of the present invention, the step (B1) of receiving the set of positioning data that defines the 3-D path on the 3-D surface further includes the step (B1,2) of receiving the set of Web-casted positioning data that defines the 3-D path on the 3-D surface. In this embodiment, the set of Web-Casted positioning data that defines the 3-D path on the 3-D surface is Web-casted from an Internet web-site.

Yet, one more aspect of the present invention is directed to an apparatus for steering a vehicle along a predetermined 2-D path on a 2-D plane. In one embodiment of the present invention, the apparatus for steering a vehicle along a predetermined 2-D path on a 2-D plane comprises: (A) a means for obtaining a set of positioning data of the vehicle; (B) a means for modifying the set of positioning data of the vehicle; (C) a means for measuring a steering angle of the front wheels of the vehicle relative to a predetermined reference direction on the 2-D plane; (D) a means for calculating a correction to the measured steering angle on the 2-D plane; and (E) a means for performing a steering action by using the correction to the measured steering angle on the 2-D plane in order to move the vehicle along the predetermined 2-D path on the 2-D plane. In one embodiment of the present invention, the (A) means for obtaining the set of positioning data of the vehicle further includes: (A1) a navigation system selected from the group consisting of: {GPS; GLONASS; combined GPS/GLONASS; GALILEO; pseudolite-based navigation system; and inertial navigation system (INS)}; and (A2) a navigation antenna mounted on the vehicle at an optimum antenna position. In one embodiment of the present invention, the means (C) for measuring the steering angle of the front wheels of the vehicle relative to the predetermined reference direction on the 2-D plane further includes an angular sensor (or a rotary potentiometer) configured to measure the steering angle of the front wheels of the vehicle relative to the predetermined reference direction on the 2-D plane. In one embodiment of the present invention, the means (D) for calculating the correction to the measured steering angle on the 2-D plane further includes (D1) a steering control algorithm configured to use a set of control data to calculate the correction to the measured steering angle on the 2-D plane, wherein the set of control data is selected from the group consisting of: {the set of modified positioning data of the vehicle; the measured steering angle on the 2-D plane; and a set of data defining the predetermined 2-D path on the 2-D plane}. In one embodiment of the present invention, the means (E) for performing the steering action by using the correction to the measured steering angle on the 2-D plane further includes: (E1) a 2-D hydraulic system configured to realize the correction to the measured steering angle on the 2-D plane; or (E2) a 2-D "flight by wire" system configured to realize the correction to the measured steering angle on the 2-D plane.

Yet, one additional aspect of the present invention is directed to an apparatus for steering a vehicle along a predetermined 3-D path on a 3-D surface. In one embodiment of the present invention, the apparatus for steering a vehicle along a predetermined 3-D path on a 3-D surface comprises: (A) a means for obtaining a set of positioning data of the vehicle; (B) a means for modifying the set of positioning data of the vehicle; (C) a 3-D means for measuring a set of steering angles of the front wheels of the vehicle relative to a predetermined reference direction on the 3-D surface; (D) a means for calculating a set of corrections to the set of measured steering angles on the 3-D surface; and (E) a means for performing a steering action by using the set of corrections to the set of measured steering angles on the 3-D surface in order to move the vehicle along the predetermined 3-D path on the 3-D surface. In one embodiment of the present invention, the (A) means for obtaining the set of positioning data of the vehicle further includes: (A1) a navigation system selected from the group consisting of: {GPS; GLONASS; combined GPS/GLONASS; GALILEO; pseudolite-based navigation system; and inertial navigation system (INS)}; and (A2) a navigation antenna mounted on the vehicle at an optimum antenna position. In one embodiment of the present invention, the means (B) for modifying the set of positioning data of the vehicle further includes a means for specifying a distance between the nominal navigation antenna position and the optimum navigation antenna position. In one embodiment of the present invention, the 3-D means (C) for measuring the set of steering angles of the front wheels of the vehicle relative to the predetermined reference direction on the 3-D surface further includes an angular sensor (or a rotary potentiometer) configured to measure the set of steering angles of the front wheels of the vehicle relative to the predetermined reference direction on the 3-D surface. In one embodiment of the present invention, the means (D) for calculating the set of corrections to the set of measured steering angles on the 3-D surface further includes (D1) a steering control algorithm configured to use a set of control data to calculate the set of corrections to the set of measured steering angles on the 3-D surface; wherein the set of control data is selected from the group consisting of: {the set of modified positioning data of the vehicle; the measured steering angle on the 3-D surface; and a set of data defining the predetermined 2-D path on the 3-D surface}. In one embodiment of the present invention, the means (E) for performing the steering action by using the set of corrections to the set of measured steering angles on the 3-D surface further includes: (E1) a 3-D hydraulic system configured to realize the set of corrections to the set of measured steering angles on the 3-D surface; or (E2) a 3-D "flight by wire" system configured to realize the set of corrections to the set of measured steering angles on the 3-D surface.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
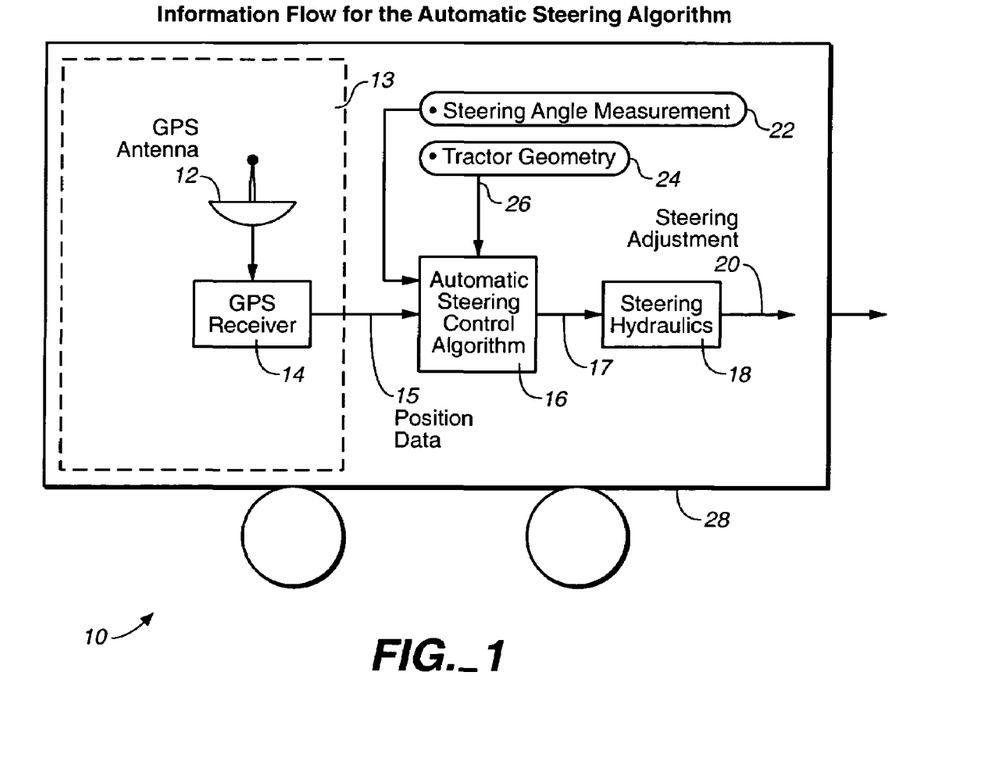
FIG. 1 depicts an information flow chart for the method of the present invention of steering a vehicle along a predetermined path by using a steering control algorithm.

FIG. 1 depicts an information flow chart 10 for the method of the present invention for steering a vehicle 28 along a predetermined path by using a steering control algorithm 16. The vehicle 28 of FIG. 1 includes a navigation system 13. In one embodiment of the present invention, the vehicle 28 of FIG. 1 includes a GPS navigation system 13 including a GPS receiver 14 and GPS antenna 14. In alternative embodiments of the present invention (not shown), the navigation system 13 is selected from the group consisting of: {GLONASS; combined GPS/GLONASS; GALILEO; pseudolite-based navigation system; and inertial navigation system (INS)}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency f1=1575.42 MHz (approximately nineteen centimeter carrier wavelength) and an L2 signal having a frequency f2=1227.6 MHz (approximately twenty-four centimeter carrier wavelength). These two frequencies are integral multiplies f1=1,540 f0 and f2=1,200 f0 of a base frequency f0=1.023 MHz. The L1 signal from each satellite is binary phase shift key (BPSK) modulated by two pseudorandom noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of $8/17$ of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1,2,\ldots 24)$ is the channel or satellite number. These frequencies lie in two bands at 1.597–1.617 GHz (L1) and 1,240–1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals. Reference to a Satellite Positioning System or SATPS herein refers to a Global Positioning System, to a Global Orbiting Navigation System, and to any other compatible satellite-based system that provides information by which an observer's position and the time of observation can be determined, all of which meet the requirements of the present invention.

GALILEO will be Europe's own global navigation satellite system, providing a highly accurate, guaranteed global positioning service under civilian control. It will be interoperable with GPS and GLONASS, the two other global satellite navigation systems. A user will be able to take a position with the same receiver from any of the satellites in any combination. By offering dual frequencies as standard, however, GALILEO will deliver real-time positioning accuracy down to the meter range, which is unprecedented for a publicly available system. It will guarantee availability of the service under all but the most extreme circumstances and will inform users within seconds of a failure of any satellite. This will make it suitable for applications where safety is crucial, such as running trains, guiding cars and landing aircraft.

The first experimental satellite, part of the so-called GALILEO System Test Bed (GSTB) will be launched in the second semester of 2005. The objective of this experimental satellite is to characterize the critical technologies, which are already under development under ESA contracts. Thereafter up to four operational satellites will be launched in the time frame 2005–2006 to validate the basic GALILEO space and related ground segment. Once this In-Orbit Validation (IOV) phase has been completed, the remaining satellites will be installed to reach the Full Operational Capability (FOC) in 2008.

The fully deployed GALILEO system consists of 30 satellites (27 operational+3 active spares), positioned in three circular Medium Earth Orbit (MEO) planes in 23616 km altitude above the Earth, and at an inclination of the orbital planes of 56 degrees with reference to the equatorial plane. Once this is achieved, the GALILEO navigation signals will provide a good coverage even at latitudes up to 75 degrees north, which corresponds to the North Cape, and beyond. The large number of satellites together with the optimization of the constellation, and the availability of the three active spare satellites, will ensure that the loss of one satellite has no discernible effect on the user.

Two GALILEO Control Centers (GCC) will be implemented on European ground to provide for the control of the satellites and to perform the navigation mission management. The data provided by a global network of twenty GALILEO Sensor Stations (GSS) will be sent to the GALILEO Control Centers through a redundant communications network. The GCC's will use the data of the Sensor Stations to compute the integrity information and to synchronize the time signal of all satellites and of the ground station clocks. The exchange of the data between the Control Centers and the satellites will be performed through so-called up-link stations. Five S-band up-link stations and 10 C-band up-link stations will be installed around the globe for this purpose. As a further feature, GALILEO will provide a global Search and Rescue (SAR) function, based on the operational Cospas-Sarsat system. To do so, each satellite will be equipped with a transponder, which is able to transfer the distress signals from the user transmitters to the Rescue Co-ordination Center, which will then initiate the rescue operation. At the same time, the system will provide a signal to the user, informing him that his situation has been detected and that help is under way. This latter feature is new and is considered a major upgrade compared to the existing system, which does not provide a feedback to the user.

A Satellite Positioning System (SATPS), such as the Global Positioning System (GPS), or the Global Orbiting Navigation Satellite System (GLONASS), or the combined GPS-GLONASS, (or the future GALILEO), uses transmission of coded radio signals, with the structure described above, from a plurality of Earth-orbiting satellites. An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS satellites. The range ($r_i$) between the location of the i-th SATPS satellite and the SATPS receiver is equal to the speed of light c times ($\Delta t_i$), wherein ($\Delta t_i$) is the time difference between the SATPS receiver's clock and the time indicated by the satellite when it transmitted the relevant phase. However, the SATPS receiver has an inexpensive quartz clock which is not synchronized with respect to the much more stable and precise atomic clocks carried on board the satellites. Consequently, the SATPS receiver estimates a pseudo-range ($pr_i$) (not a true range) to each satellite. After the SATPS receiver determines the coordinates of the i-th SATPS satellite by demodulating the transmitted ephemeris parameters, the SATPS receiver can obtain the solution of the set of the simultaneous equations for its unknown coordinates ($x_0, y_0, z_0$) and for unknown time bias error (cb). The SATPS receiver can also determine velocity of a moving platform.

Referring still to FIG. 1, in one embodiment of the present invention, the navigation system 13 comprises a pseudolite navigation system. Pseudolites are ground-based transmitters that can be configured to emit GPS-like signals for enhancing the GPS by providing increased accuracy, integrity, and availability. Accuracy improvement can occur because of better local geometry, as measured by a lower vertical dilution of precision (VDOP). Availability is increased because a pseudolite provides an additional ranging source to augment the GPS constellation.

Referring still to FIG. 1, in one embodiment of the present invention, the navigation system 13 comprises an Inertial Navigation System (INS). Recent advances in Inertial Navigation Systems (INS) technologies makes it feasible to build a very small, low power INS system. Acceleron Technology, Inc., located in San Francisco, Calif., has built small light weight Inertial Navigation System (INS) using three accelerometers to measure three components of the local acceleration vector, three magnetometers to measure three components of the local gravitational vector, plus some software. An accelerometer is a sensor that measures acceleration, speed and the distance by mathematically determining acceleration over time. A magnetometer is a device that measures a local magnetic field. The local gravitational factor can be calculated by using the measured local magnetic field, because the local gravitational field, as well as the local magnetic field, are both defined by the local Earth geometry, as well explained in the book "Applied Mathematics in Integrated Navigation Systems", published by American Institute of Aeronautics and Astronautics, Inc, 2000, by Robert M. Rogers. The "Applied Mathematics in Integrated Navigation Systems" teaches how geometrical shape and gravitational models for representing the Earth are used to provide relationship between ECEF position x-y-z components and local-level latitude, longitude, and attitude positions. The "Applied Mathematics in Integrated Navigation Systems" also teaches how a vehicle's position change in geographical coordinates is related to the local Earth relative velocity and Earth curvature.

In addition to using three magnetometers to measure three components of the local gravitational vector, in one embodiment of the present invention, the three components of the local gravitational vector can be measured by using the satellite technology.

Indeed, every star and planet generates a force, or field, of gravity. This force of attraction ensures that the Earth flies around the Sun and the Moon around the Earth. If the Earth were a perfect sphere, the gravitational force field around our planet would be completely symmetrical and would diminish uniformly in all directions away from it. However that is not the case.

In another embodiment of the present invention, FIG. 1 depicts an information flow chart 10 for the method of the present invention of steering a vehicle 28 along a 2-D path on a 2-D plane by using a steering control algorithm 16, wherein the geometrical trajectory of the desired route (for instance, the same trajectory Y=y (x; z=const)) does not define a predetermined 2-D path. Instead, the trajectory Y=y (x; z=const) is input into the memory (not shown) of the navigation system 13 in real time to take into account the obstacles, like boulders, animals, people, trees, or other obstructions that may enter the path of a vehicle unexpectedly. In one embodiment, the real-time 2-D trajectory can be broadcasted from a Base Station. In another embodiment, the real-time 2-D trajectory can be broadcasted from a continuously updated real time Web Site.

In one embodiment, the navigation system 13 (of FIG. 1) provides for different modes of control. These modes include (1) a fully autonomous mode, where navigation of the vehicle 28 is automatically handled by the on-board navigation system 13; (2) a tele or remote control mode, where a remote human operator may control the direction and motion, and so on, of the vehicle 28; and (3) a manual mode, where a human operator sitting in the cab can take control of the vehicle and drive it manually.

In one embodiment, the navigation system, referring still to FIG. 1, the navigation system 13 (fully described above)

is used to obtain a set of positioning data of the vehicle 28 on the predetermined 2-D trajectory on a 2-D plane (z=const) Y=Y(x: z=const)), or on the real-time inputted 2-D trajectory on a 2-D plane (z=const) Y=Y(x: z=const)) by using the navigation antenna 12 mounted at the optimum antenna position. However, the steering control algorithm 16 assumes the different, nominal antenna position at the predetermined reference point. Therefore, the positioning data of the vehicle 28 (the vehicle's coordinates and the vehicle's velocity vector) obtained by the navigation antenna 12 should be modified to take into account the difference between the nominal antenna position and the optimum antenna position. (Please, see discussion below).

In one embodiment of the present invention, referring still to the information flow for the automatic steering control algorithm depicted in FIG. 1, block 16 includes a typical automatic steering control algorithm itself which uses as a reference point the predetermined reference point of the vehicle 28. (Please, see discussion below).

In one embodiment of the present invention, when the vehicle 28 (of FIG. 1) includes a tractor, the predetermined reference point of the vehicle for the purposes of the typical automatic steering control algorithm lies in the center of the rear axle of a front steer tractor. The algorithm utilizes the coordinates and the velocity vector (the speed and the direction-heading) of the navigation antenna 12 (for instance, a GPS antenna 12). This set of data 15 (the coordinates and the velocity vector) is typically provided by the navigation receiver 14 (for example, by a GPS receiver 14). In this embodiment, the angle of the front wheels of the vehicle relative to the rear axle is also measured, for example by a rotary potentiometer or other suitable sensor. The set of measured steering angles data 22 is provided to the control algorithm 16. In this embodiment, the set of geometric data 24 related to the tractor, such as the distance between the rear axle and the front axle, is also provided to the control algorithm 16. The distance between the rear axle and the front axle should be specified. This can be done either by measuring directly the distance between the rear axle and the front axle of the vehicle, or by calculating the distance between the rear axle and the front axle based on known geometry of the vehicle.

Based on all this information, including the set of position data 15, the velocity vector 15, the set of measured steering angles, and the set of tractor geometrical data 24 including the distance between the rear axle and the front axle, the automatic steering control algorithm 16 calculates a correction 17 to the steering angle, which, by a suitable mechanism, such as a hydraulic system 18, is transformed to the set of angular steering adjustments 20 for the tractor.

As was stated above, the predetermined reference point of the vehicle for the purposes of the typical automatic steering control algorithm lies in the center of the rear axle of a front steer tractor. If the navigation antenna 12 (for instance, the GPS antenna) is actually mounted over the center of the rear axle, the automatic control steering algorithm 16 (of FIG. 1) will perform as designed. However, if the navigation antenna 12 (for instance, the GPS antenna) is placed at the optimum position which is different form the nominal predetermined antenna position, the control algorithm will interpret the received position and velocity of the vehicle as if the position and velocity of the vehicle are determined at the center of the rear axle. Consequently, the control algorithm would calculate the erroneous adjustments to the steering angle, thus resulting in a poor automatic steering performance of the control algorithm.

The present invention is designed to make adjustments to the position and velocity of the vehicle 28 determined by the navigation system 13 to accommodate for the actual optimum position of the navigation antenna, so that the adjusted position and velocity correspond to the position and the velocity of the vehicle 28 at the nominal predetermined antenna position, i.e., at the center of the rear axle in this example. Thus, the control algorithm itself is never modified, but rather its input information is pre-adjusted. This provides a very practical method to adapt the automatic steering algorithm to various tractors and tractor configurations. Please, see the full discussion below.

Figure 2:
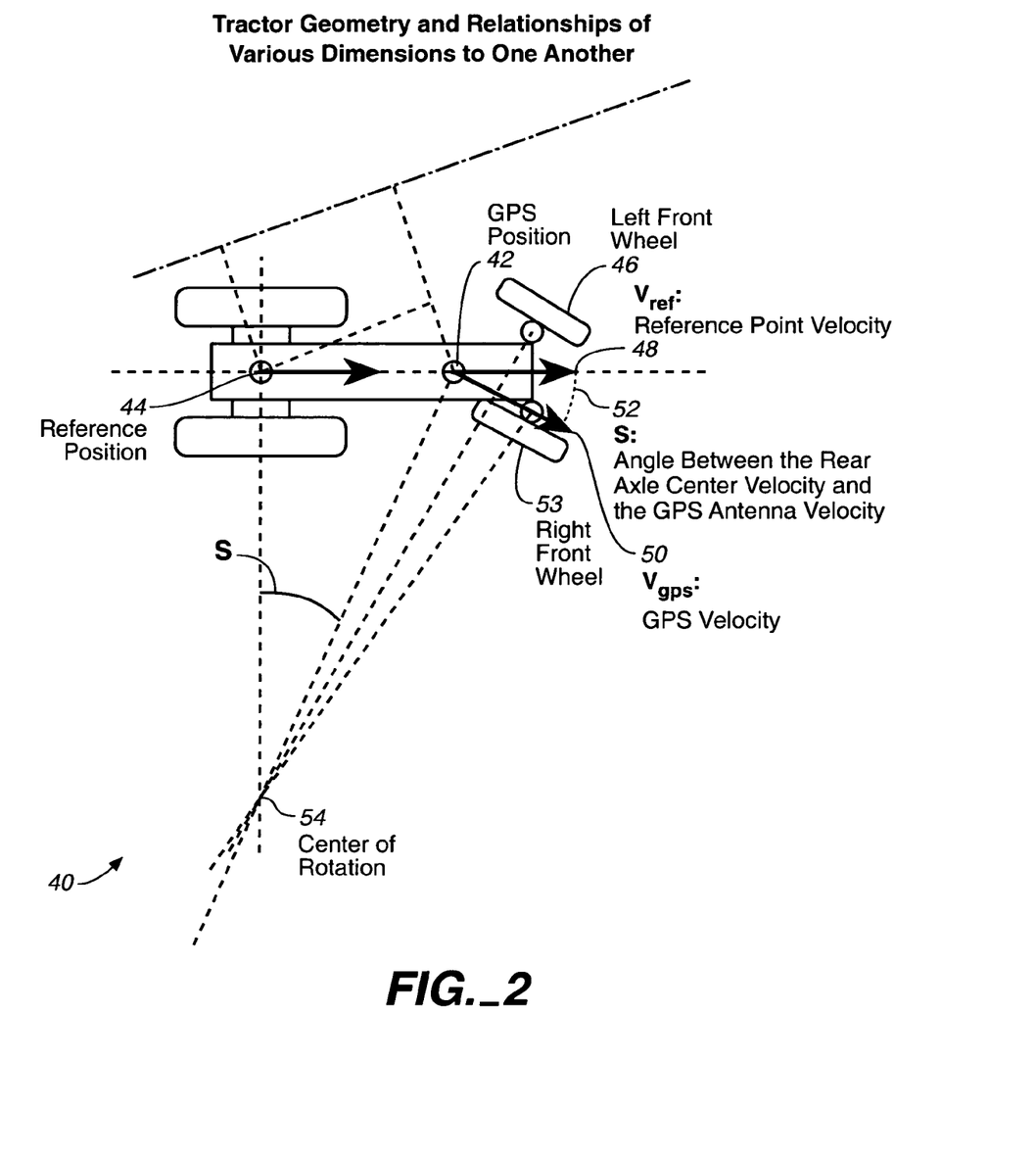
FIG. 2 is an example of an actual tractor geometry and different geometrical relationship for the purposes of the control algorithm of the present invention.

FIG. 2 depicts as an example an actual tractor geometry 40 and different geometrical relationship for the purposes of the control algorithm of the present invention including: the actual optimum antenna position 42, the reference nominal antenna position 44, the left front wheel 46, the velocity vector $V_{ref}$ at the reference point 48, the GPS-derived velocity $V_{GPS}$ 50, the angle S 52 between the rear axle center velocity $V_{ref}$ and the GPS antenna velocity $V_{GPS}$, the right front wheel 53, and the center of rotation 54.

An automatic steering algorithm can be formulated for any position of the navigation antenna (for instance, the GPS antenna). However, the prior art requires the formulation and design of the algorithm for each and every placement of the navigation (GPS) antenna. The present invention allows one to use a single automatic steering algorithm for any position of the navigation antenna without any change, provided that the obtained coordinates and velocity of the vehicle are transformed based on the steering angle and the relative position of the antenna with respect to the reference point.

More specifically, in one embodiment of the prior art, the basic steering algorithm is as follows:

$$\Theta = G(P, \Psi_e, x_e); \quad (Eq. 1)$$

where

G is the steering control algorithm parameterized by P;

P are the parameters of the vehicle, such as its length, height, width, current speed, etc;

$\Psi_e$ is the error in the heading, i.e., the difference between a desired direction and the current direction of the motion of the vehicle;

$x_e$ is the error in the position, i.e., the difference between a desired position and the current position of the vehicle;

$\Theta$ is a calculated desired steering angle, which, when enforced to the steering mechanism of the vehicle, moves the vehicle onto a desired path such that $\Psi_e$ and $x_e$ become zero over time When these error terms are zero and stay zero, the vehicle is on-track.

Some prior art basic steering algorithms are scalable. One explicit example of a scalable steering control algorithm G of Eq. (1) is given below. This scalable steering control algorithm G assumes a front-steer type, and assumes that the GPS antenna is mounted over the center of the rear axle:

$$\Theta_{desired} = (L/V)K_\Psi \Psi_e + (L/V^2)K_x x_e. \quad (Eq. 2).$$

where $\Psi_e$ is the heading error with reference to a desired trajectory and with the reference to the GPS antenna location on the tractor;

$x_e$ is the position error with reference to a desired trajectory and with the reference to the GPS antenna location on the tractor.

The scalable control algorithm given in Eq. (2) includes the method of calculating the desired steering angle $\Theta_{desired}$ that is parameterized by the length of the vehicle (tractor) L and by the speed of the vehicle (tractor) V. Hence, this algorithm is applicable to a wide range of vehicles (tractors) with different lengths and at different driving speeds provided the navigation (GPS) antenna is mounted over the center of the rear axle.

The scalability of the control algorithm is significant because, otherwise, one would need to develop a steering control algorithm for every type of vehicle. However, the same scalable control algorithm is applicable to all vehicles of the same class. For instance, as all front steer vehicles can use the same steering control algorithm by simply using the particular measurable vehicle parameter, like its length L. The scalable control algorithm is valid at any constant vehicle's speed V.

The prior art steering control algorithm takes as its input data the positional data and the velocity vector of the vehicle obtained by its navigation system having a navigation antenna mounted at the nominal predetermined location 44 (of FIG. 1). However, there are situations when a navigation antenna (for example, a GPS antenna) cannot be mounted at the nominal predetermined location 44 (of FIG. 2), as illustrated in diagram 60 of FIG. 3. If this is the case, the position and speed (velocity) information obtained by its navigation system having a navigation antenna mounted at the optimum location 62 can be translated into the speed (velocity) and position of the vehicle at the referenced (expected) nominal location 64 of the navigation (GPS) antenna. In the example given 60 in FIG. 3, the nominal antenna mounting location 62 is at the center of the rear axle.

EXAMPLE

Figure 3:
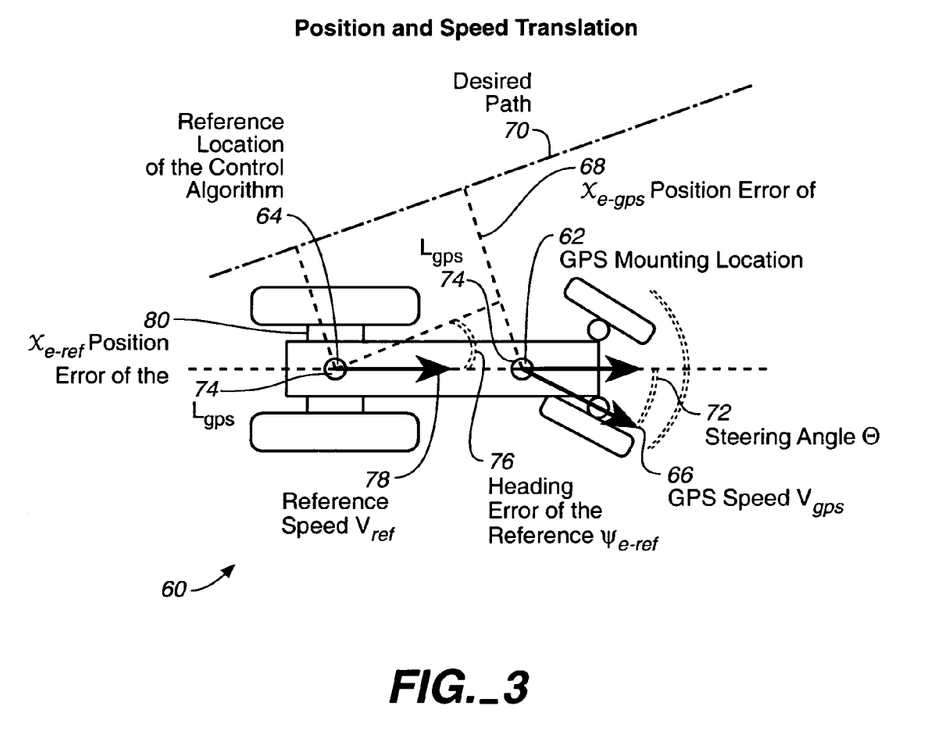
FIG. 3 illustrates how to transform the input data for a control algorithm designed for a vehicle having a navigation antenna mounted at the optimum for such a vehicle location which is different from the predetermined nominal antenna location.

Translation of the position and speed (velocity) information obtained by the navigation system having the navigation antenna mounted at the optimum location 62 into the speed (velocity) and position at the referenced (expected) nominal location 64 of the navigation (GPS) antenna, as illustrated in FIG. 3:

IF:

$\Psi_{e\text{-}gps}$, the heading error at the GPS antenna mounting location 62;

$V_{gps}$ 66, the velocity obtained by the GPS antenna at the GPS antenna mounting location 62;

$x_{e\text{-}gps}$ 68, the position error at the location of the GPS antenna with regard to the desired trajectory 70;

$\Theta$ 72, the measured steering angle;

$L_{GPS}$ 74, the measured distance between the reference point 64 and the location of the GPS antenna 62;

The following variables:

$\Psi_{e\text{-}ref}$ 76, the heading error at the reference point 64;

$V_{ref}$ 78, the velocity at the reference point 64; and $x_{e\text{-}ref}$ 80, the position error at the reference point 64 with respect to the desired trajectory 70;

are calculated as follows by the using the control algorithm in the scalable form given by (Eq. 2):

$$\Psi_{e\text{-}ref} = \omega_{e\text{-}gps} - \Theta; \quad \text{(Eq. 3)}$$

$$V_{ref} = V_{gps}/\cos(\Theta); \quad \text{(Eq. 4)}$$

$$x_{e\text{-}ref} = x_{e\text{-}gps} - L_{GPS}\tan(\Theta). \quad \text{(Eq. 4)}$$

In the example above, the vehicle was positioned in a 2-D plane and the reference trajectory was shown to be a straight line, for the sake of simplicity in explaining the concept. This process can be generalized to spatial 2-D positioning and arbitrary shaped 2-D reference trajectories.

In one embodiment of the present invention, the steering angle $\Theta$ of the vehicle on the 2-D plane can be measured by using an angular sensor. FUTEK Advanced Sensor Technology, located at 10 Thomas, Irvine, Calif. 92618 USA, manufactures angular sensors for robotic control that can be used for the purposes of the present invention. In another embodiment of the present invention, the steering angle $\Theta$ of the vehicle on the 2-D plane can be measured by using a rotary potentiometer. Servo Instrument Corporation Manufacturer located at 240 Lynn Street, P.O. Box 43, Baraboo, Wis. 53913, manufactures a complete line of precision conductive plastic and wirewound potentiometers that can be used for the purposes of the present invention.

In one embodiment of the present invention, the actual steering action on the 2-D plane can be performed by using a 2-D hydraulic system. Hydraulic Systems Limited, headquartered in Dartmouth, Nova Scotia, manufactures a wide array of hydraulic power systems that can be used to realize the correction to the measured steering angle on the 2-D plane.

In another embodiment of the present invention, the actual steering action on the 2-D plane can be performed by using a 2-D "flight by wire" system. General Motors is working to perfect an electronic power steering system, or a "flight by wire" system, for its new cars. This electronic power steering system can be used for the purposes of the present invention in order to realize the correction to the measured steering angle on the 2-D plane.

Another aspect of the present invention is directed to a method of steering a vehicle along a predetermined, (or along a real time inputted, or broadcasted) 3-D path on a 3-D surface by using a steering control algorithm. Indeed, the above given discussion can be generalized to a more general situation when a vehicle is moving along a predetermined 3-D path on a 3-D surface. If this is the case, a single steering angle should be replaced by a set of measured steering angles {roll, yaw, and pitch} on the 3-D surface; and a steering action should be performed by using the set of corrections to the set of measured steering angles {roll, yaw, and pitch} on the 3-D surface in order to move the vehicle along the predetermined 3-D path on the 3-D surface.

In order to calculate the set of corrections to the set of measured steering angles on the 3-D plane, one should use the generalized steering control algorithm in its scalable form:

$$YAW_{desired} = (L/V)K_{yaw,\Psi}\Psi_e + (L/V)K_{yaw,\Phi}\Phi_e + (L/V^2)K_{yaw,x}x_e + (L/V^2)K_{yaw,y}y_e. \quad \text{(Eq. 5)}$$

$$Roll_{desired} = (L/V)K_{roll,\Psi}\Psi_e + (L/V)K_{roll,\Phi}\Phi_e + (L/V^2)K_{roll,x}x_e + (L/V^2)K_{roll,y}y_e. \quad \text{(Eq. 6)}$$

$$Pitch_{desired} = (L/V)K_{pitch,\Psi}\Psi_e + (L/V)K_{pitch,\Phi}\Phi_e + (L/V^2)K_{pitch,x}x_e + (L/V^2)K_{pitch,y}y_e. \quad \text{(Eq. 6)}$$

where:

$\Psi_e$ is the heading error in 'x' direction with reference to a desired trajectory and with the reference to the GPS antenna location on the tractor;

$x_e$ is the position error in 'x' direction with reference to a desired trajectory and with the reference to the GPS antenna location on the tractor;

$\Phi_e$ is the heading error in 'y' direction with reference to a desired trajectory and with the reference to the GPS antenna location on the tractor;

$y_e$ is the position error in 'y' direction with reference to a desired trajectory and with the reference to the GPS antenna location on the tractor.

The foregoing description of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of steering a vehicle along a predetermined 2-D path on a 2-D plane by using a steering control algorithm, said vehicle including a single navigation system and including a navigation antenna, said navigation antenna being mounted on said vehicle at an optimum antenna position, said steering control algorithm assuming a nominal antenna position at a predetermined reference point; said method comprising the steps of:
   (A) obtaining a set of positioning data of said vehicle by using said single navigation system and by using said navigation antenna mounted at said optimum antenna position;
   (B) pre-adjusting said set of positioning data obtained in said step (A) and feeding said pre-adjusted set of positioning data into said steering control algorithm;
   (C) measuring a steering angle of the front wheels of said vehicle relative to a predetermined reference direction on said 2-D plane;
   (D) calculating a correction to said measured steering angle on said 2-D plane; and
   (E) performing a steering action by using said correction to said measured steering angle on said 2-D plane in order to move said vehicle along said predetermined 2-D path on said 2-D plane.

2. The method of claim 1, wherein said step (A) of obtaining said set of positioning data of said vehicle by using said single navigation system and by using said navigation antenna mounted at said optimum antenna position further includes the step of:
   (A1) obtaining said set of positioning data of said vehicle by using a navigation system selected from the group consisting of: {GPS; GLONASS; combined GPS/GLONASS; GALILEO; pseudolite-based navigation system; and inertial navigation system (INS) }.

3. The method of claim 1, wherein said step (B) of pre-adjusting said set of positioning data obtained in said step (A) and feeding said pre-adjusted set of positioning data into said steering control algorithm further includes the step of:
   (B1) specifying a distance between said nominal antenna position and said optimum antenna position.

4. The method of claim 1, wherein said step (C) of measuring said steering angle of said vehicle on said 2-D plane further includes the step of:
   (C1) using an angular sensor to measure said steering angle of the front wheels of said vehicle relative to said predetermined reference direction on said 2-D plane.

5. The method of claim 1, wherein said step (C) of measuring said steering angle of said vehicle on said 2-D plane further includes the step of:
   (C2) using a rotary potentiometer to measure said steering angle of the front wheels of said vehicle relative to said predetermined reference direction on said 2-D plane.

6. The method of claim 1, wherein said step (D) of calculating said correction to said measured steering angle on said 2-D plane further includes the steps of:
   (D1) feeding a set of control data into said steering control algorithm; wherein said set of control data is selected from the group consisting of: {said set of pre-adjusted positioning data of said vehicle; said measured steering angle on said 2-D plane; and a set of data defining said predetermined 2-D path on said 2-D plane}; and
   (D2) calculating said correction to said measured steering angle on said 2-D plane by using said steering control algorithm.

7. The method of claim 1, wherein said step (E) of performing said steering action by using said correction to said measured steering angle on said 2-D plane further includes the step of:
   (E1) using a 2-D hydraulic system to realize said correction to said measured steering angle on said 2-D plane.

8. The method of claim 1, wherein said step (E) of performing said steering action by using said correction to said measured steering angle on said 2-D plane further includes the step of:
   (E2) using a 2-D "flight by wire" system to realize said correction to said measured steering angle on said 2-D plane.

9. A method of steering a vehicle along a predetermined 3-D path on a 3-D surface by using a steering control algorithm, said vehicle including a single navigation system and including a navigation antenna, said navigation antenna being mounted on said vehicle at an optimum antenna position, said steering control algorithm assuming a nominal antenna position at a predetermined reference point; said method comprising the steps of:
   (A) obtaining a set of positioning data of said vehicle by using said single navigation system and by using said navigation antenna mounted at said optimum antenna position;
   (B) pre-adjusting said set of positioning data obtained in said step (A) and feeding said pre-adiusted set of positioning data into said steering control algorithm;
   (C) measuring a set of steering angles on said 3-D surface;
   (D) calculating a set of corrections to said set of measured steering angles on said 3-D surface; and
   (E) performing a steering action by using said set of corrections to said set of measured steering angles on said 3-D surface in order to move said vehicle along said predetermined 3-D path on said 3-D surface.

10. The method of claim 9, wherein said step (A) of obtaining said set of positioning data of said vehicle by using said single navigation system and by using said navigation antenna mounted at said optimum antenna position further includes the step of:
    (A1) obtaining said set of positioning data of said vehicle by using a navigation system selected from the group consisting of: {GPS; GLONASS; combined GPS/GLONASS; GALILEO; pseudolite-based navigation system; and inertial navigation system (INS) }.

11. The method of claim 9, wherein said step (B) of pre-adjusting said set of positioning data obtained in said step (A) and feeding said pre-adjusted set of positioning data into said steering control algorithm; further includes the step of:
    (B1) specifying a distance between said nominal antenna position and said optimum antenna position.

12. The method of claim 9, wherein said step (C) of measuring said set of steering angles of said vehicle on said 3-D surface further includes the step of:
(C1) using at least one angular sensor to measure said set of steering angles on said 3-D surface.

13. The method of claim 9, wherein said step (C) of measuring said set of steering angles of said vehicle on said 3-D surface further includes the step of:
(C2) using at least one rotary potentiometer to measure said set of steering angles on said 3-D surface.

14. The method of claim 9, wherein said step (D) of calculating said set of corrections to said set of measured steering angles on said 3-D surface further includes the steps of:
(D1) feeding a set of control data into said steering control algorithm; wherein said set of control data is selected from the group consisting of: {said set of pre-adjusted positioning data of said vehicle; said measured steering angle on said 3-D surface; and a set of data defining said predetermined 3-D path on said 3-D surface}; and
(D2) calculating said set of corrections to said set of measured steering angles on said 3-D plane by using said steering control algorithm.

15. The method of claim 9, wherein said step (E) of performing said steering action by using said set of corrections to said set of measured steering angles on said 3-D surface further includes the step of:
(E1) using a 3-D hydraulic system to realize said set of corrections to said set of measured steering angles on said 3-D surface.

16. The method of claim 9, wherein said step (E) of performing said steering action by using said set of corrections to said set of measured steering angles on said 3-D plane further includes the step of:
(E2) using a 3-D "flight by wire" system to realize said set of corrections to said set of measured steering angles on said 3-D plane.

17. A method of steering a vehicle along a 2-D path on a 2-D plane by using a steering control algorithm, said vehicle including a single navigation system and including a navigation antenna, said navigation antenna being mounted on said vehicle at an optimum antenna position, said steering control algorithm assuming a nominal antenna position at a predetermined reference point; said method comprising the steps of:
(A) obtaining a set of positioning data of said vehicle by using said single navigation system and by using said navigation antenna mounted at said optimum antenna position;
(B) obtaining a set of positioning data that defines said 2-D path on said 2-D plane;
(C) pre-adjusting said set of positioning data obtained in said step (A) and feeding said pre-adjusted set positioning data into said steering control algorithm;
(D) measuring a steering angle of the front wheels of said vehicle relative to a predetermined reference direction on said 2-D plane;
(E) calculating a correction to said measured steering angle on said 2-D plane; and
(F) performing a steering action by using said correction to said measured steering angle on said 2-D plane in order to move said vehicle along said 2-D path on said 2-D plane.

18. The method of claim 17, wherein said step (A) of obtaining said set of positioning data of said vehicle by using said single navigation system and by using said navigation antenna mounted at said optimum antenna position further includes the step of:
(A1) obtaining said set of positioning data of said vehicle by using a navigation system selected from the group consisting of: {GPS; GLONASS; combined GPS/GLONASS; GALILEO; pseudolite-based navigation system; and inertial navigation system (INS) }.

19. The method of claim 17, wherein said step (B) of obtaining said set of positioning data that defines said 2-D path on said 2-D plane further includes the step of:
(B1) receiving said set of positioning data that defines said 2-D path on said 2-D plane by said navigation antenna.

20. The method of claim 17, wherein said step (B1) of receiving said set of positioning data that defines said 2-D path on said 2-D plane further includes the step of:
(B1,1) receiving a set of broadcasted positioning data that defines said 2-D path on said 2-D plane; wherein said set of broadcasted positioning data that defines said 2-D path on said 2-D plane is broadcasted by a Base Station (BS).

21. The method of claim 17, wherein said step (B1) of receiving said set of positioning data that defines said 2-D path on said 2-D plane further includes the step of:
(B1,2) receiving a set of Web-casted positioning data that defines said 2-D path on said 2-D plane; wherein said set of Web-casted positioning data that defines said 2-D path on said 2-D plane is Web-casted from an Internet web-site.

22. The method of claim 17, wherein said step (C) of pre-adjusting said set of positioning data obtained in said step (A) and feeding said pre-adjusted set of positioning data into said steering control algorithm; further includes the step of:
(C1) specifying a distance between said nominal antenna position and said optimum antenna position.

23. The method of claim 17, wherein said step (D) of measuring said steering angle of said vehicle on said 2-D plane further includes the step of:
(D1) using an angular sensor to measure said steering angle of the front wheels of said vehicle relative to said predetermined reference direction on said 2-D plane.

24. The method of claim 17, wherein said step (E) of calculating said correction to said measured steering angle on said 2-D plane further includes the steps of:
(E1) feeding said set of pre-adiusted positioning data of said vehicle and said measured steering angle on said 2-D plane into said steering control algorithm; and
(E2) using said steering control algorithm that utilizes a set of control data to calculate said correction to said measured steering angle on said 2-D plane; wherein said set of control data is selected from the group consisting of: {said set of pre-adiusted positioning data of said vehicle; said measured steering angle on said 2-D plane; and said set of positioning data that defines said 2-D path on said 2-D plane}.

25. The method of claim 17, wherein said step (F) of performing said steering action further includes the step of:
(F1) using a hydraulic system to realize said correction to said measured steering angle on said 2-D plane.

26. The method of claim 17, wherein said step (F) of performing said steering action further includes the step of:
(F1) using a "flight by wire" system to realize said correction to said measured steering angle on said 2-D plane.

27. A method of steering a vehicle along a 3-D path on a 3-D surface by using a steering control algorithm, said vehicle including a single navigation system and including a navigation antenna, said navigation antenna being mounted on said vehicle at an optimum antenna position, said steering control algorithm assuming a nominal antenna position at a predetermined reference point; said method comprising the steps of:
- (A) obtaining a set of positioning data of said vehicle by using said single navigation system and by using said navigation antenna mounted at said optimum antenna position;
- (B) obtaining a set of positioning data that defines said 3-D path on said 3-D surface;
- (C) pre-adjusting said set of positioning data obtained in said step (A) and feeding said set of pre-adjusted positioning data into said steering control algorithm;
- (D) measuring a set of steering angles of the front wheels of said vehicle on said 3-D surface;
- (E) calculating a set of corrections to said set of measured steering angles on said 3-D surface; and
- (F) performing a steering action by using said set of corrections to said set of measured steering angles on said 3-D surface in order to move said vehicle along said 3-D path on said 3-D surface.

28. The method of claim 27, wherein said step (A) of obtaining said set of positioning data of said vehicle by using said single navigation system and by using said navigation antenna mounted at said optimum antenna position further includes the step of:
- (A1) obtaining said set of positioning data of said vehicle by using a navigation system selected from the group consisting of: {GPS; GLONASS; combined GPS/GLONASS; GALILEO; pseudolite-based navigation system; and inertial navigation system (INS) }.

29. The method of claim 27, wherein said step (B) of obtaining said set of positioning data that defines said 3-D path on said 3-D surface further includes the step of:
- (B1) receiving said set of positioning data that defines said 3-D path on said 3-D surface by said navigation antenna.

30. The method of claim 27, wherein said step (B1) of receiving said set of positioning data that defines said 3-D path on said 3-D surface further includes the step of:
- (B1, 1) receiving a set of broadcasted positioning data that defines said 3-D path on said 3-D surface; wherein said set of broadcasted positioning data that defines said 3-D path on said 3-D surface is broadcasted by a Base Station (BS).

31. The method of claim 27, wherein said step (B1) of receiving said set of positioning data that defines said 3-D path on said 3-D surface further includes the step of:
- (B1, 2) receiving said set of Web-casted positioning data that defines said 3-D path on said 3-D surface; wherein said set of Web-Casted positioning data that defines said 3-D path on said 3-D surface is Web-casted from an Internet web-site.

32. The method of claim 27, wherein said step (C) of pre-adjusting said set of positioning data obtained in said step (A) and feeding said set of pre-adjusted positioning data into said steering control algorithm further includes the step of:
- (C1) specifying a distance between said nominal antenna position and said optimum antenna position.

33. The method of claim 27, wherein said step (D) of measuring said set of steering angles of said vehicle on said 3-D surface further includes the step of:
- (D1) using an angular sensor to measure said set of steering angles of the front wheels of said vehicle on said 3-D surface.

34. The method of claim 27, wherein said step (E) of calculating said set if corrections to said set of measured steering angles on said 3-D surface further includes the steps of:
- (E1) feeding said set of pre-adjusted positioning data of said vehicle and said set of measured steering angles on said 3-D surface into said steering control algorithm; and
- (E2) using said steering control algorithm that utilizes a set of control data to calculate said set of corrections to said set of measured steering angles on said 3-D surface; wherein said set of control data is selected from the group consisting of: {said set of pre-adjusted positioning data of said vehicle; said set of measured steering angles on said 3-D surface; and said set of positioning data that defines said 3-D path on said 3-D surface}.

35. The method of claim 27, wherein said step (F) of performing said steering action further includes the step of:
- (F1) using a hydraulic system to realize said set of corrections to said set of measured steering angles on said 3-D plane.

36. The method of claim 27, wherein said step (F) of performing said steering action further includes the step of:
- (F1) using a "flight by wire" system to realize said set of corrections to said set of measured steering angles on said 3-D surface.

37. An apparatus for steering a vehicle along a predetermined 2-D path on a 2-D plane comprising:
- (A) a single positioning means for obtaining a set of positioning data of said vehicle;
- (B) a means for pre-adjusting said set of positioning data of said vehicle;
- (C) a means for measuring a steering angle of the front wheels of said vehicle relative to a predetermined reference direction on said 2-D plane;
- (D) a means for calculating a correction to said measured steering angle on said 2-D plane; and
- (E) a means for performing a steering action by using said correction to said measured steering angle on said 2-D plane in order to move said vehicle along said predetermined 2-D path on said 2-D plane.

38. The apparatus of claim 37, wherein said (A) single positioning means for obtaining said set of positioning data of said vehicle further includes:
- (A1) a navigation system selected from the group consisting of: {GPS; GLONASS; combined GPS/GLONASS; GALILEO; pseudolite-based navigation system; and inertial navigation system (INS)}; and
- (A2) a navigation antenna mounted on said vehicle at an optimum antenna position.

39. The apparatus of claim 38, wherein said navigation antenna is assumed to be mounted at a nominal navigation antenna position a predetermined reference point, and wherein said means (B) for pre-adjusting said set of positioning data of said vehicle further includes:
- (B1) a means for specifying a distance between said nominal navigation antenna position and said optimum navigation antenna position.

40. The apparatus of claim 37, wherein said means (C) for measuring said steering angle of the front wheels of said vehicle relative to said predetermined reference direction on said 2-D plane further includes:

(C1) an angular sensor configured to measure said steering angle of the front wheels of said vehicle relative to said predetermined reference direction on said 2-D plane.

41. The apparatus of claim 37, wherein said means (C) for measuring said steering angle of the front wheels of said vehicle relative to said predetermined reference direction on said 2-D plane further includes:
(C1) a rotary potentiometer configured to measure said steering angle of the front wheels of said vehicle relative to said predetermined reference direction on said 2-D plane.

42. The apparatus of claim 37, wherein said means (D) for calculating said correction to said measured steering angle on said 2-D plane further includes:
(D1) a steering control algorithm configured to use a set of control data to calculate said correction to said measured steering angle on said 2-D plane; wherein said set of control data is selected from the group consisting of: {said set of pre-adjusted positioning data of said vehicle; said measured steering angle on said 2-D plane; and a set of data defining said predetermined 2-D path on said 2-D plane}.

43. The apparatus of claim 37, wherein said means (E) for performing said steering action by using said correction to said measured steering angle on said 2-D plane further includes:
(E1) a 2-D hydraulic system configured to realize said correction to said measured steering angle on said 2-D plane.

44. The apparatus of claim 37, wherein said means (E) for performing said steering action by using said correction to said measured steering angle on said 2-D plane further includes:
(E2) a 2-D "flight by wire" system configured to realize said correction to said measured steering angle on said 2-D plane.

45. An apparatus for steering a vehicle along a predetermined 3-D path on a 3-D surface comprising:
(A) a single positioning means for obtaining a set of positioning data of said vehicle;
(B) a means for pre-adjusting said set of positioning data of said vehicle;
(C) a 3-D means for measuring a set of steering angles of the front wheels of said vehicle relative to a predetermined reference direction on said 3-D surface;
(D) a means for calculating a set of corrections to said set of measured steering angles on said 3-D surface; and
(E) a means for performing a steering action by using said set of corrections to said set of measured steering angles on said 3-D surface in order to move said vehicle along said predetermined 3-D path on said 3-D surface.

46. The apparatus of claim 45, wherein said (A) single positioning means for obtaining said set of positioning data of said vehicle further includes:
(A1) a navigation system selected from the group consisting of: {GPS; GLONASS; combined GPS/GLONASS; GALILEO; pseudolite-based navigation system; and inertial navigation system (INS)}; and
(A2) a navigation antenna mounted on said vehicle at an optimum antenna position.

47. The apparatus of claim 46, wherein said navigation antenna is assumed to be mounted at a nominal navigation antenna position a predetermined reference point, and wherein said means (B) for pre-adjusting said set of positioning data of said vehicle further includes:
(B1) a means for specifying a distance between said nominal navigation antenna position and said optimum navigation antenna position.

48. The apparatus of claim 45, wherein said 3-D means (C) for measuring said set of steering angles of the front wheels of said vehicle relative to said predetermined reference direction on said 3-D surface further includes:
(C1) an angular sensor configured to measure said set of steering angles of the front wheels of said vehicle relative to said predetermined reference direction on said 3-D surface.

49. The apparatus of claim 45, wherein said 3-D means (C) for measuring said set of steering angles of the front wheels of said vehicle relative to said predetermined reference direction on said 3-D surface further includes:
(C1) a rotary potentiometer configured to measure said set of steering angles of the front wheels of said vehicle relative to said predetermined reference direction on said 3-D surface.

50. The apparatus of claim 45, wherein said means (D) for calculating said set of corrections to said set of measured steering angles on said 3-D surface further includes:
(D1) a steering control algorithm configured to use a set of control data to calculate said set of corrections to said set of measured steering angles on said 3-D surface; wherein said set of control data is selected from the group consisting of: {said set of pre-adjusted positioning data of said vehicle; said measured steering angle on said 3-D surface; and a set of data defining said predetermined 2-D path on said 3-D surface}.

51. The apparatus of claim 45, wherein said means (E) for performing said steering action by using said set of corrections to said set of measured steering angles on said 3-D surface further includes:
(E1) a 3-D hydraulic system configured to realize said set of corrections to said set of measured steering angles on said 3-D surface.

52. The apparatus of claim 45, wherein said means (E) for performing said steering action by using said set of corrections to said set of measured steering angles on said 3-D surface further includes:
(E2) a 3-D "flight by wire" system configured to realize said set of corrections to said set of measured steering angles on said 3-D surface.

* * * * *